_United States Patent_ [19]

Andre

[11] Patent Number: 4,921,218

[45] Date of Patent: May 1, 1990

[54] TRANSLATION NUT TO BE USED IN A LIFTING UNIT

[75] Inventor: Jean-Luc Andre, Dangolsheim, France

[73] Assignee: Lohr, S.A., Hangenbieten, France

[21] Appl. No.: 289,060

[22] Filed: Dec. 23, 1988

[30] Foreign Application Priority Data

Dec. 23, 1987 [FR] France .............................. 87 18266

[51] Int. Cl.⁵ ................................................ B66F 3/08
[52] U.S. Cl. .................... 254/98; 74/424.8 R; 187/25
[58] Field of Search .................. 187/8.47, 24, 25, 26; 74/424.8 R, 89.15; 254/98, 89 R; 269/172; 411/190

[56] References Cited

U.S. PATENT DOCUMENTS

| 2,218,319 | 10/1940 | Pfauser | 254/98 |
| 2,654,264 | 10/1953 | Auriol | 74/424.8 R |
| 2,936,625 | 5/1960 | Heiseler | 74/424.8 R |
| 2,979,965 | 4/1961 | Diebold | 74/424.8 R |
| 4,279,329 | 7/1981 | Gehran | 254/98 |
| 4,747,320 | 5/1988 | Nilsson | 74/424.8 R |

Primary Examiner—Robert C. Watson
Attorney, Agent, or Firm—Schwartz & Weinrieb

[57] ABSTRACT

Translation nut for a lifting unit.

Translation nut remarkable due to the combination of a sliding block (1) with a threaded tubular casing (19) on which it rests by means of a ball bearing (22), said bearing and, by support, the sliding block being selectively engaged by coupling and uncoupling means through an intermediary coaxial piece moving axially in movements of coupling and uncoupling under the effect of said coupling and uncoupling means.

This invention is of value to manufacturers and assemblers of truck bodies.

10 Claims, 5 Drawing Sheets

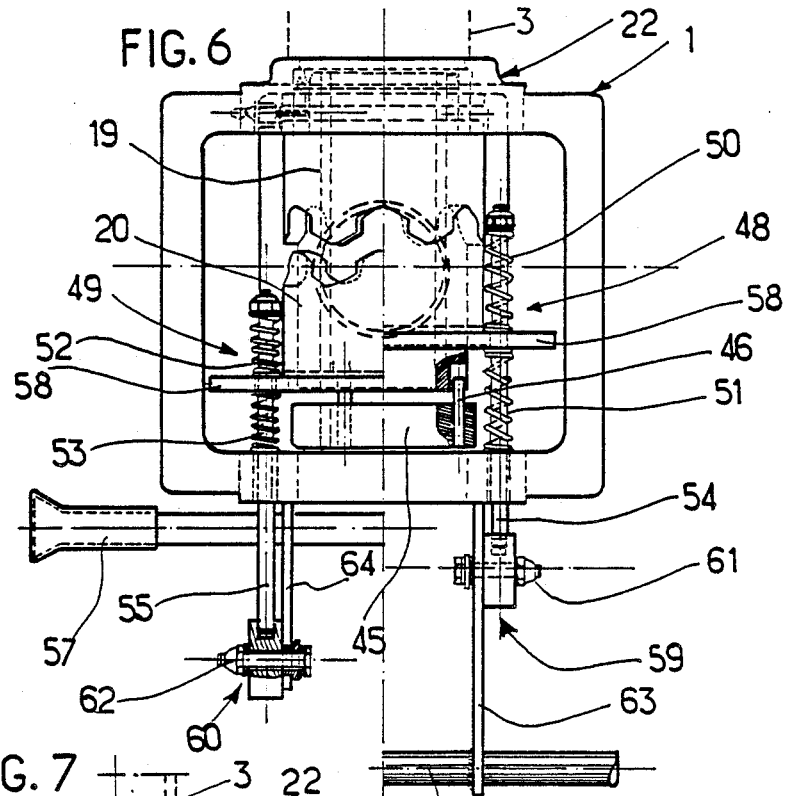
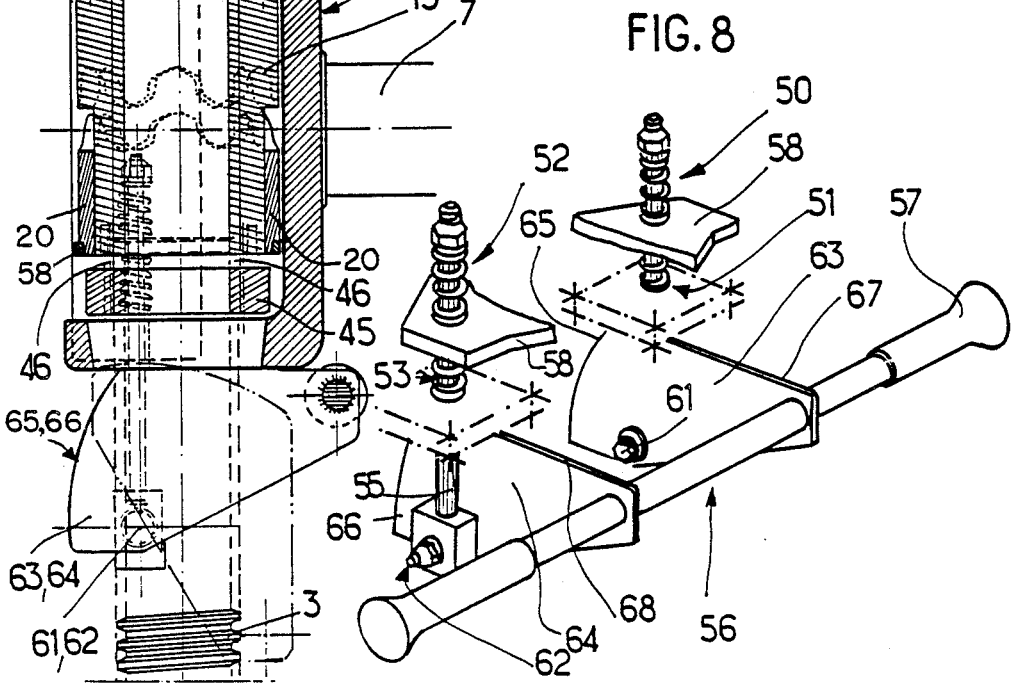

TRANSLATION NUT TO BE USED IN A LIFTING UNIT

The present invention relates to a disengageable translation nut to be used in a lifting unit specifically in a lifting unit containing one or more carrying platforms and/or loading decks such as those of a car-carrying vehicle.

Of course, other applications may be possible in similar or adjacent areas such as the areas of loading, handling, lifting of loads or persons.

To lift or bring to level carrying platforms or decks, or to move a carrying platform or several carrying platforms parallel to a horizontal loading deck, or to incline them with relation to a horizontal loading deck, conventionally one uses for each platform four mechanisms with screws roughly vertical and with nuts connected to the carrying platform, each mounted onto a screw. Each screw is enclosed in a vertical piece called a post.

The simultaneous rotation of the screws of the same screw couple sustaining the same platform causes the vertical displacement of the carrying platform along the posts.

In the case of several platforms habitually comprising the carrying equipment of a vehicle or a convoy of car-carriers, it is indispensable to keep total independence of movements between the carrying platforms.

This independence results from the necessity to accomplish—individually and successively—the loading then the lifting and, if any, the tilting of each carrying platform.

Conventionally, to date, total independence of the movements of two platforms is obtained only by two lifting mechanisms that are separate or formed at the level of each post by two parallel independent screws proper to each carrying platform, activated individually and separately by two different controls.

In the case of three carrying platforms, three separate whole mechanisms, screws and nuts, and their individual control are necessary in the same post.

The purpose of the present invention is to remedy this disadvantage by enabling, with a single screw per post, the totally independent control of two or three or more carrying platforms.

To this end, the invention relates to a translation nut to be used in a unit lifting mechanism specifically for a carrying platform or loading deck characterized in that it contains a sliding block connected or articulated to the carrying platform, a threaded tubular casing fixed in this sliding block mounted on a screw, a rotation support by means of which the sliding block bears upon the upper end of the threaded tubular casing, a mechanical coupling and uncoupling connection between the threaded tubular casing and a coaxial intermediary piece susceptible to axial movements of coupling and uncoupling along the tubular casing and beyond the rotation support under the effect of coupling and uncoupling means to allow the free turning of or block the rotation of the threaded tubular casing on itself in order to move the sliding block along the screw or to deprive the screw of the translation effect by letting the threaded tubular casing turn freely on the rotation support by its being moved in rotation by the screw on which it is mounted depending on the coupled or uncoupled condition of the threaded tubular casing and the intermediary piece supplied by the selectively controlled coupling and uncoupling means.

Numerous advantages follow from the present invention; the main advantages will be cited here:

presence of a single screw per post for the independent lifting of several carrying platforms. Therefore, at least one screw per post can be eliminated;
perfect integration into the mechanical lifting unit;
simplicity of construction;
single mechanical driving for a single screw;
positive safety: the default or failure of control causes blockage in translation;
in the disengaged state, the platform remains in its position without any other means of blockage, acting as a lock: the load is maintained even in stoppage;
additional safety is obtained by a simple maintenance nut at rest acting as a wear indicator.

The technical characteristics and other advantages will become evident by reading the following description, which is provided as an example and is not restrictive of the preferred methods of design which are given as non-restrictive examples referring to the accompanying drawings in which.

Figure 9:
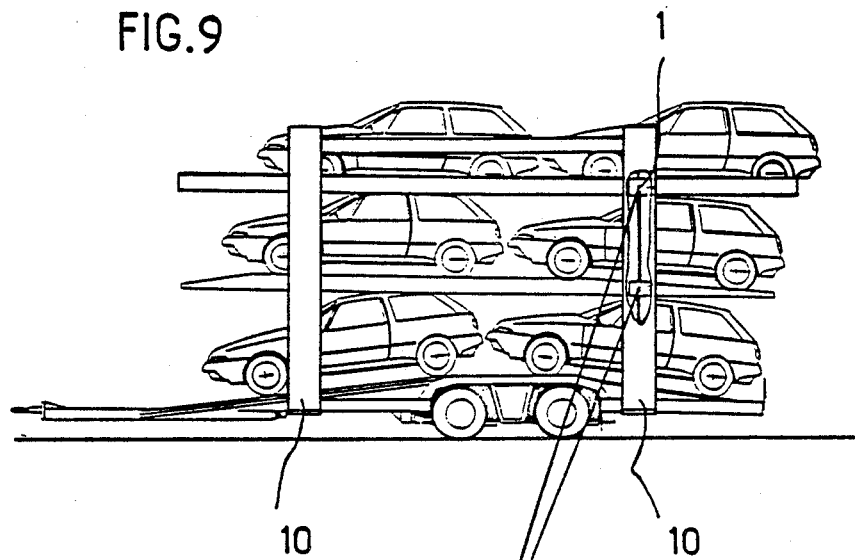
Figure 10:
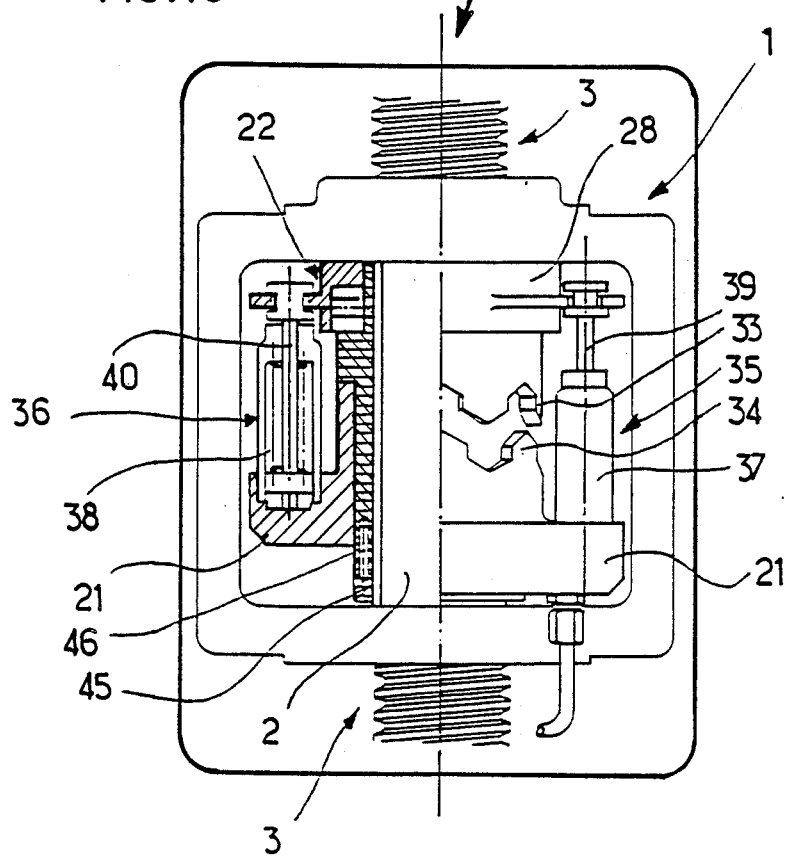

FIG. 7 mixed view in transverse section and in profile of a manual-control variant;

FIG. 6 is a top view of the same manual-control variant with one side lowered and the other side raised;

FIG. 8 is a simplified schematic view in perspective of the manual-control mechanism pursuant to FIGS. 6 and 7;

FIG. 9 is a schematic view of installation on a car-carrying vehicle with two mobile carrying platforms, with a cut-away view of one post;

FIG. 10 is an enlarged top view of a nut as shown in cut-away view in FIG. 9.

Below, the invention will be described using several variants of execution, including a manual-control variant. Quite obviously, it cannot be limited purely to the specific means described.

The present invention proceeds from the general inventive idea that consists of making a nut in two parts, which nut is splitable under the effect of means of mechanical, pneumatic, hydraulic or electric control of coupling or uncoupling activated from a single outside control. One part is mounted on the screw and turns freely in the uncoupled state. The other part is fixed to a sliding block carrying, with its counterparts, the carrying platform. The sliding block is carried by the nut per se, by means of a mechanical support of translation free in rotation.

Below, we will examine in greater detail the specific means used to accomplish the various functions combined in the disengageable translation nut according to the invention.

The translation nut according to the invention is comprised of a sliding block 1 containing the nut per se 2 mounted on a single threaded screw or stem 3 for a support post such as those that exist, for example, on a car-carrying vehicle. The sliding block 1 is generally shaped like a stirrup with sides 4 and 5, the lateral protrusion of which 6 is extended by an articulated arm 7 connected to a carrying platform 8.

The block 1 slides along a piece 9, for example C-shaped, comprising a post 10.

The guiding and the gliding of the sliding block 1 along each post 10 are improved by U-shaped runners 11 and 12 that cover its sides 4 and 5.

In order to make a rotation bearing for the tubular casing, the runners 11 and 12 each have on at least one of their lateral sides a return 13 and 14 situated, when the runner is in place, on the same side of the stirrup.

Of course, any other equivalent means is suitable.

Moreover, the same screw can carry, at different levels, several disengageable translation nuts pursuant to the invention in the case of several carrying platforms.

As indicated, the invention makes it possible, with a single screw per post, to support several platforms simultaneously while controlling their movement separately.

The sliding block 1 containing the nut per se 2 is traversed by the screw 3 on each of its sides, upper and lower, by openings 15 and 16 having, on their underside, shoulders respectively 17 and 18 whereby it is possible to keep the nut 2 per se fixed in the block 1.

The nut 2 per se is composed of a threaded tubular casing 19 mounted on the screw and an intermediary piece 20 coaxial to the screw, joined onto the tubular casing 19, susceptible to axial movements of translation between a low position and a high position under the effect of active means operated by an outside control. The intermediary piece 20 has, on the lower part, a base 21 in peripheral protrusion.

Figure 3:
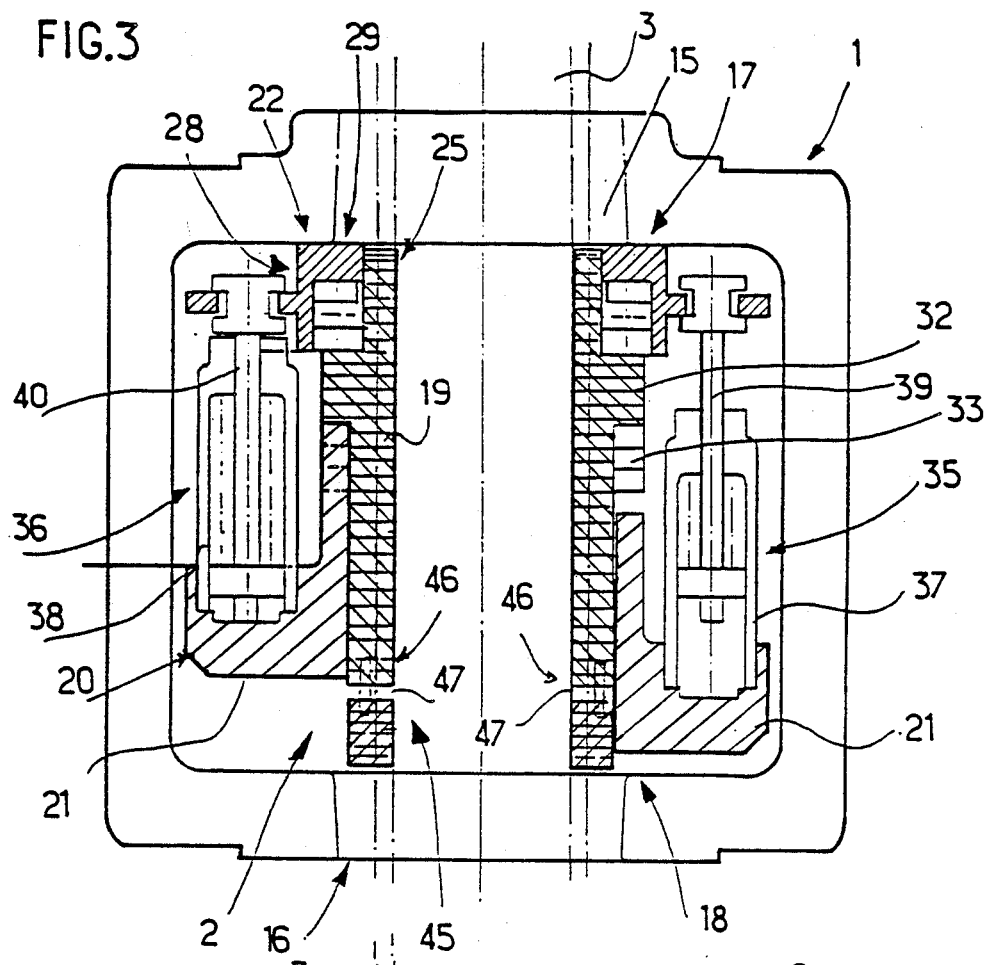
FIG. 3 is a median vertical longitudinal sectional view showing in right half-part the uncoupled nut and in left half-part the coupled component parts.
Figure 4:
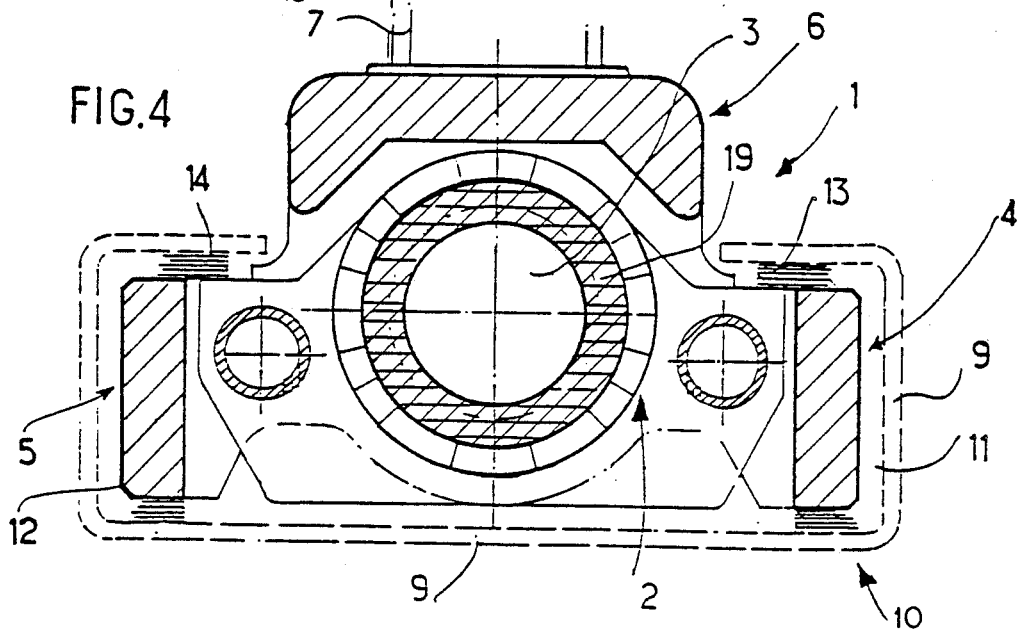
FIG. 4 is a horizontal transverse sectional view at the level of the coupling configurations according to line IV—IV of FIG. 1 with sectional figuration of the guide piece comprising the post.
Figure 5:
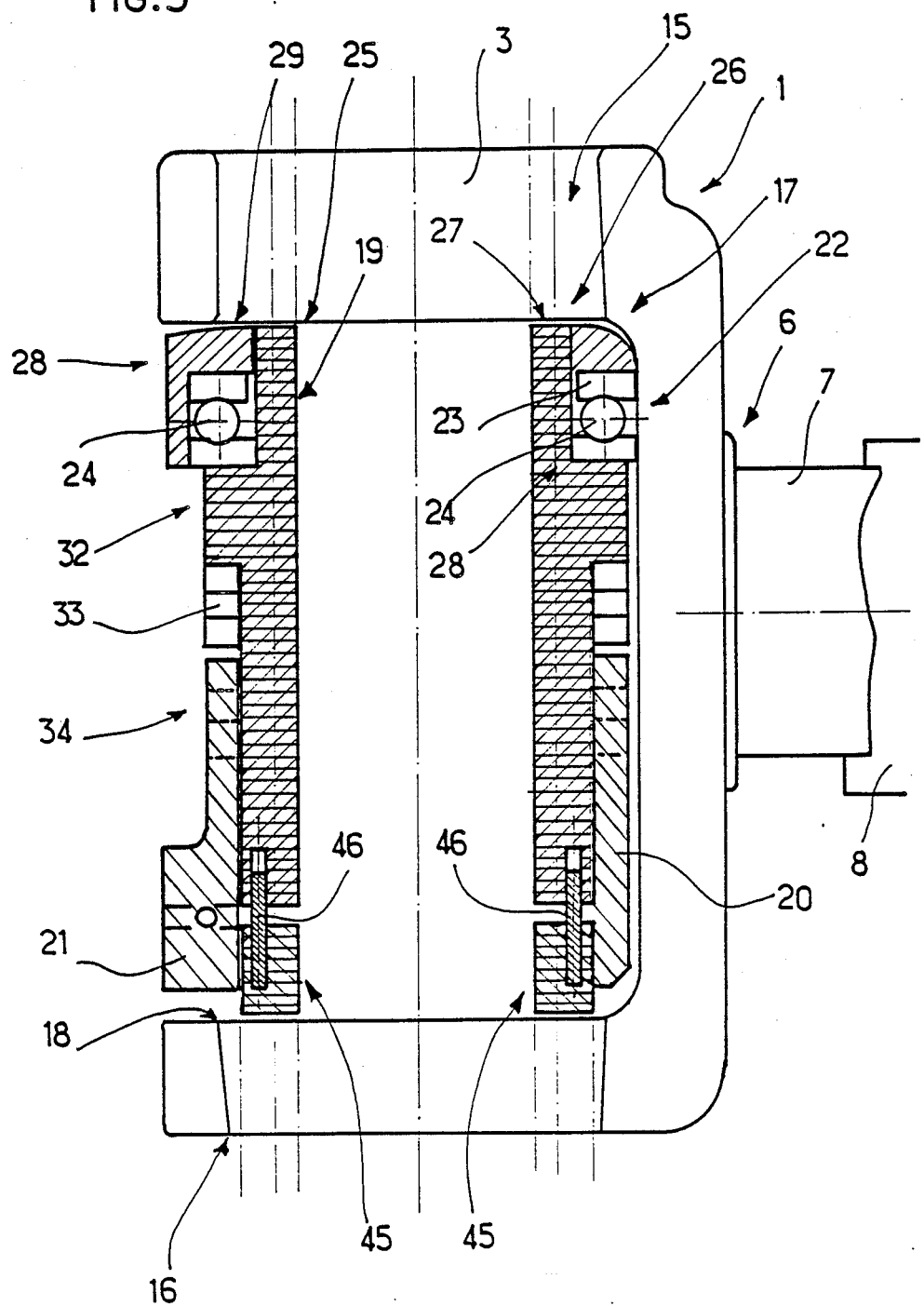
FIG. 5 is a median vertical longitudinal sectional view in the plane of the control jacks.

The sliding block 1 is raised in mechanical support by the load on the end of the threaded tubular casing 19 by a mechanical support piece free in rotation, for example a ball bearing 22, or other bearing, represented specifically in FIGS. 3 and 5.

This ball bearing is conventionally comprised of a crown 23 with balls such as 24, joined to the upper end of the tubular casing 19 shaped like a neck 25 at end 26 and at shoulder 27 which acts as a seat for it.

Figure 1:
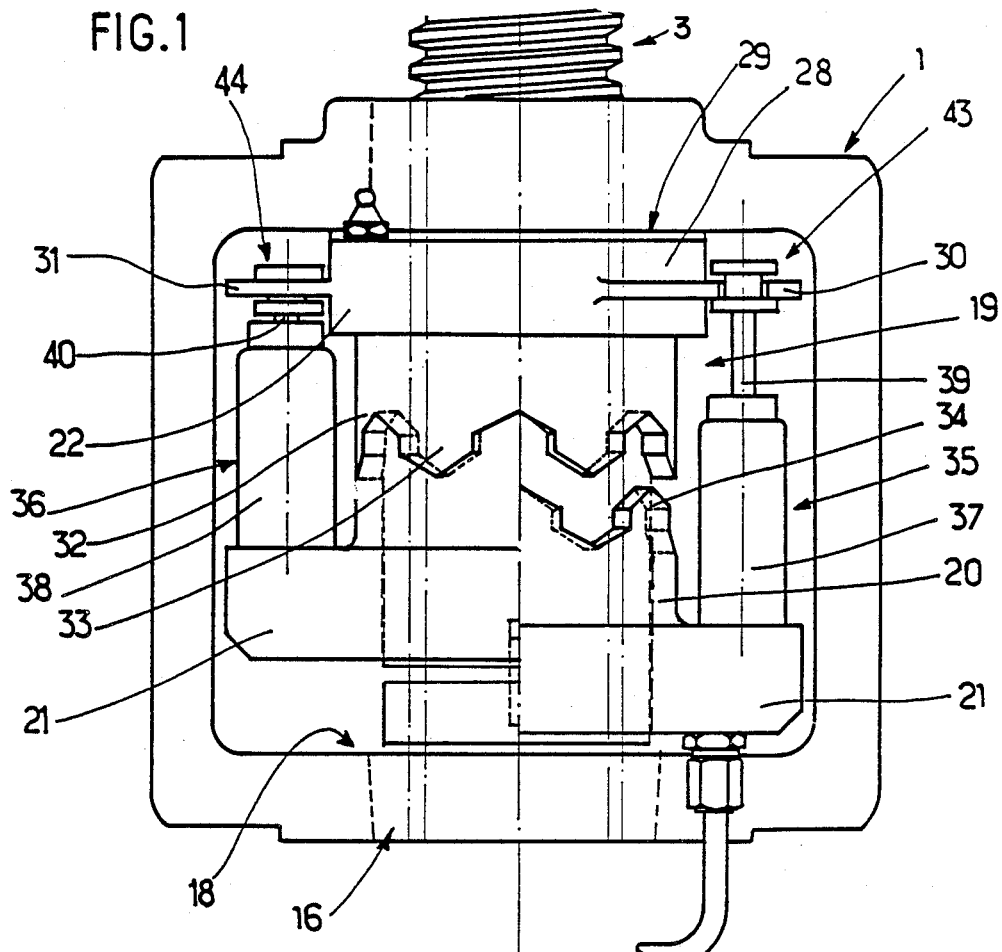
FIG. 1 is a schematic view in perspective of the nut according to the invention with manoeuvering by jacks showing in right half-part the uncoupled nut and in left half-part the coupled component parts.
Figure 2:
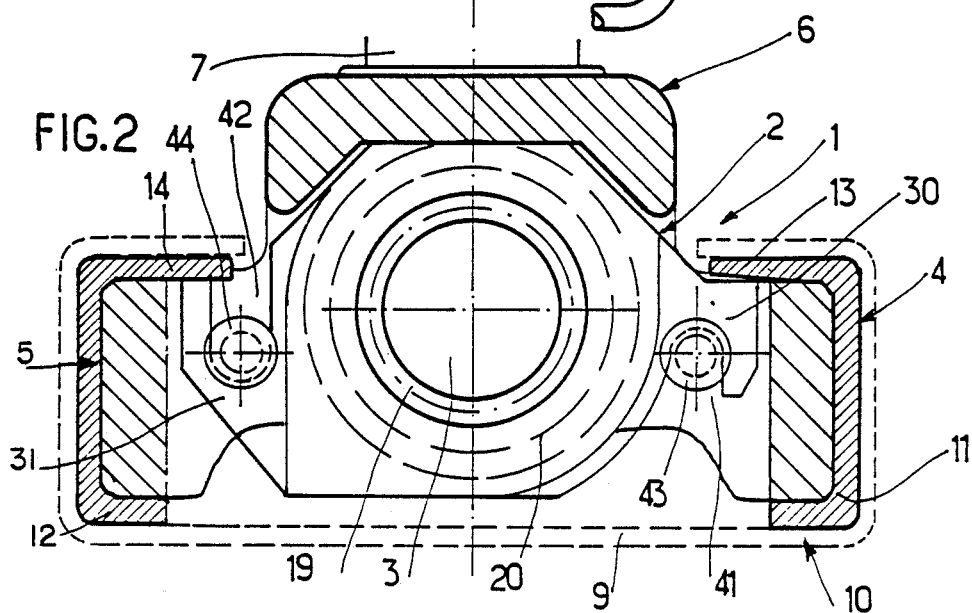
FIG. 2 is a horizontal transverse sectional view according to line II—II of FIG. 1 with sectional figuration of the guide piece comprising the post.

This crown is maintained in place by a closing piece 28 shaped as a bearing cage whose upper side 29 acts as a support surface for the sliding block and has lateral extensions 30 and 31 in the shape of ears (FIG. 1).

The closing piece 28 is immobilized in rotation in one direction and in the other by abutment of one or the other ear on one or the other return 13 or 14 of the runners 11 or 12.

By this structure, the threaded tubular casing is raised in rotation with relation to the sliding block. The movements of rotation of the screw do not cause longitudinal displacement of the tubular casing because the tubular casing, when not braked or not blocked, turns freely on itself.

As you will see below, one of the original aspects of the invention consists, by appropriate means, of making the selective mechanical connection between the threaded casing 19 and the coaxial intermediary piece 20.

According to a method of execution described below, the mechanical connection and the release are accomplished by the following general means consisting of coupling means by controlled bringing together or bringing apart.

The threaded tubular casing 19 has a coupling crown 32 the lower part of which is shaped like teeth 33 with a profile suited to mechanical engagement.

Similarly, the sliding intermediary piece 20 has an upper end with teeth 34 of an equivalent profile.

The mechanical coupling is accomplished by bringing the facing teeth closer to each other and their interpenetration under the effect of coupling and uncoupling means mounted between the intermediary piece and a fixed piece, for example the closing piece 28 of the ball bearing.

According to the method that we have chosen as our example, the means of coupling and uncoupling are, for example, two pneumatic or hydraulic jacks 35 and 36 with bodies 37 and 38 joined to the base 21 of the intermediary piece and to stems 39 and 40 articulated or mounted onto the closing piece of the ball bearing, for example in the holes 41 and 42 with the help of pieces 43 and 44.

The elastic drawback is directed toward the top which makes it possible to obtain a coupled connection, i.e. a blockage when the control of the jacks is not activated.

Of course, the means of coupling and uncoupling can be replaced by equivalent means, for example electromechanical or electromagnetic means that serve the same function.

Their role consists of bringing the coupling structures together and apart in order to establish or break the mechanical connection between the intermediary piece and the threaded tubular casing.

At its lower end, inside the sliding block 1, the threaded tubular casing 19 has a safety nut 45 mounted axially floating on the screw by a mechanical connection of rotation leaving freedom of longitudinal translation. To do this, the safety nut 45 is, for example, joined to the threaded casing 19 by several axial pins such as 46 arranged axially to the screw on a circumference corresponding to a circle interior to the, for example, median material. The nut is mounted floating at an interval 47 from the low end of the threaded tubular casing 19.

The pins provide only a mechanical connection which can be separated to keep the floating character of the mechanical assembly. Therefore, they are mounted with a certain play.

This safety nut simultaneously serves three functions. Firstly, it provides additional safety because it constitutes a second nut capable of carrying the load if the threaded tubular casing ruptures. Second, it participates in the low end guiding of the intermediary piece. Finally, it serves as a wear indicator of the screw thread of the threaded tubular casing.

Indeed, wear and tear of the threading of the threaded tubular casing 19 is manifested in a smaller interval 47 between the nut and the lower end of the tubular casing.

For the sake of thoroughness, below we will describe a manual-control variant with reference to FIGS. 6, 7 and 8.

According to this variant, the drawback spring jacks are each replaced by at least two means of elastic constraint 48 and 49, for example springs 50, 51 and 52, 53 mounted per couple, in opposition on the sliding stems 54 and 55 activated by a manoeuvre bar 56 ending in handles such as 57.

The springs are mounted on both sides in compression against a fork 58 which acts as a support base to maintain in axial displacement the base carrying the intermediary piece 20.

The lower ends 59 and 60 of the stems 54 and 55 are mounted articulated for example by transverse axes 61 and 62 on parallel platens acting as cams 63 and 64 twinned at the end by the manoeuvre bar 56.

The cams each have a curved transverse part 65 and 66 comprising the cam profile followed on the upper part by a flat side 67 or 68 which bears upon the underside of the sliding block 1 acting as support.

The intermediary piece 20 will occupy, according to the position of the manoeuvre bar 56, high or low, a low position in which the nut is disengaged or a high position in which the teeth 33 and 34 facing each other are engaged.

On the upper part, we find the mechanical support of translation in free rotation, for example a ball bearing 22.

We also note here the safety nut 45 and the axial pins 46 which indicate the degree of wear and tear.

Thus, we have constructed a mechanical means of manoeuvering equivalent to the one previously described using drawback spring jacks.

We will now explain the functioning of the disengageable nut according to the invention.

In released position, the threaded tubular casing 19 supports the sliding block 1 by means of the ball bearing 22. The elastic drawback jacks 35 and 36 are controlled in pressure. They are thus brought out, i.e. maintained at their low level by the pressure of the control fluid. In this position, the intermediary piece with its base carrying the jacks is in low position, the position in which the coupling structures, lower and upper teeth, are separated.

Any rotation of the screw causes a rotation of the threaded tubular casing on itself, which is then inoperative for translation of the sliding block due to the mechanical separation of the component parts. The nut does not move longitudinally along the screw, leaving the platform immobile in translation. The platform keeps the position that it occupied at the time of the release.

This state of blockage remains constant, and comprises a positive safety unto itself.

When the jacks are released, the stems go back into the jack body under the action of the drawback spring, thereby raising the base to make the intermediary piece slide along the smooth outside wall of the threaded tubular casing.

The teeth engage and the coupling is produced immediately if the teeth are in correspondence or, otherwise, after the first fractions of rotation turns of the threaded tubular casing.

After coupling, the rotation of the threaded tubular casing is stopped due to the stronger couple from the mobile coaxial gear represented by the intermediary piece, the jacks and the closing piece of the ball bearing which ends its angular run in abutment against the returns of the runners or against any other equivalent abutment piece.

The rotation of the screw drives the unit in axial translation.

The initial rotation of the screw drives the threaded tubular casing as far as the mechanical coupling. Rotation continuing beyond the coupling drives the unit in translation along the screw due to the reaction provided by the greater couple presented by the base and the mobile gear consisting of the mobile abutment and the jacks.

The control of the jacks, i.e. the pressurizing in the jacks or the electric control on the electromechanical devices or the manoeuvering of the mechanical manual-control device, causes the backward movement of the base in low position and hence disengagement.

The disengageable translation nut according to the invention separates rapidly and the unit stops in its current vertical position, serving the function of a lock until the next activation of the control.

The same holds true for the different translation nuts according to the invention arranged on all the posts or on two of them, supporting any carrying deck.

We state here that the translation nut according to the invention can be used in pairs on corresponding posts to tilt carrying decks.

The great advantage of the invention concerns the possibility of controlling, simultaneously or separately, in lifting, totally independently, a second carrying deck using a second translation nut mounted on the same screw in each of the posts. It is sufficient to selectively activate one or the other group of nuts proper to each carrying deck to raise or lower one or the other carrying deck individually.

Sundry means, derived or equivalent, serving the same functions as well as all variants without inventive contribution, adjunction of inoperative elements or other simple modifications within the framework of the present invention.

I claim:

1. A translation screw-nut system for a lifting unit operatively associated with a support platform to be adjustably moved in a translational manner, comprising:
a sliding block operatively connected to said support platform;
a threaded screw disposed for rotation about a longitudinal axis thereof;
a nut threadedly engaged upon said threaded screw;
means supporting said sliding block upon said nut for permitting said threaded screw and said nut to rotate relative to said sliding block;
first rotational transmission engagement means fixedly mounted upon said nut; and
second rotational transmission engagement means movably mounted upon said sliding block between a first position at which said second rotational transmission engagement means is operatively separated from said first rotational transmission engagement means of said nut such that rotation of said threaded screw and said nut is not transmitted to said sliding block, and a second position at which said second rotational transmission engagement means is operatively connected to said first rotational transmission engagement means of said nut such that rotation of said threaded screw relative to said nut and said sliding block causes translational movement of said sliding block and said support platform.

2. A system as set forth in claim 1, wherein:
said nut has the form of a cylindrical tubular casing.

3. A system as set forth in claim 1, wherein:

said means supporting said sliding block upon said nut comprises a ball bearing system.

4. A system as set forth in claim 2, wherein:

said second rotational transmission engagement means comprises a non-threaded cylindrical tubular sleeve disposed about said cylindrical tubular casing nut.

5. A system as set forth in claim 4, wherein:

said first rotational transmission engagement means comprises a first set of engagement teeth disposed upon said cylindrical tubular casing nut; and said second rotational transmission engagement means comprises a second set of engagement teeth disposed upon said non-threaded cylindrical tubular sleeve.

6. A system as set forth in claim 1, further comprising: means for moving said second rotational transmission engagement means between said first and second positions.

7. A system as set forth in claim 6, wherein:

said means for moving said second rotational transmission engagement means comprises piston-cylinder assemblies.

8. A system as set forth in claim 1, further comprising:

an auxiliary nut threadedly engaged upon said threaded screw and disposed at an axial position separate from said nut; and means interconnecting said nut and said auxiliary nut.

9. A system as set forth in claim 8, wherein:

said means interconnecting said nut and said auxiliary nut comprise a plurality of axially extending pins.

10. A system as set forth in claim 6, wherein:

said means for moving said second rotational transmission engagement means comprises spring-biasing assemblies.

* * * * *